United States Patent [19]
Suzuki et al.

[11] Patent Number: 5,353,017
[45] Date of Patent: Oct. 4, 1994

[54] CALL SELECTIVE RECEIVER BUILT IN WITH VIBRATOR

[75] Inventors: Toru Suzuki, Yokohama; Tetsuo Matsumura, Tokyo, both of Japan

[73] Assignee: Matsushita Electric Industrial Co., Ltd., Osaka, Japan

[21] Appl. No.: 894,772

[22] Filed: Jun. 5, 1992

[30] Foreign Application Priority Data

Aug. 6, 1991 [JP] Japan .................. 3-219300

[51] Int. Cl.⁵ .................................. H04B 1/08
[52] U.S. Cl. .................. 340/825.46; 455/348; 340/407.1
[58] Field of Search ......... 340/311.1, 825.44, 825.46, 340/407.1, 407.2; 455/348, 351, 316; 361/679, 730, 733, 756

[56] References Cited

U.S. PATENT DOCUMENTS

| | | | |
|---|---|---|---|
| 4,755,816 | 7/1988 | DeLuca | 340/825.44 |
| 4,879,759 | 11/1989 | Matsumoto et al. | 455/348 |
| 5,043,721 | 8/1991 | May | 340/825.44 |
| 5,073,767 | 12/1991 | Holmes et al. | 340/825.44 |
| 5,181,023 | 1/1993 | Fujii | 340/825.46 |
| 5,263,195 | 11/1993 | Panther et al. | 455/316 |

FOREIGN PATENT DOCUMENTS 63-120436  8/1988  Japan ................ H04B 7/26

*Primary Examiner*—Donald J. Yusko
*Assistant Examiner*—Edward Merz
*Attorney, Agent, or Firm*—Mason, Fenwick & Lawrence

[57] ABSTRACT

A call selective receiver body includes a built-in rechargeable small battery and a small vibrator, and a belt clip for receiving the receiver body includes a built-in dry battery having an electric capacity significantly greater than that of the small battery in the receiver body and a relatively large built-in vibrator. When the receiver body is put into the belt clip, a vibrator control signal output terminal of the receiver body is connected with a vibrator control signal input terminal of the belt clip, and electric power input terminals of the receiving body are connected with electric power output terminals of the belt clip, whereby the electric power source for the receiver is switched from the smaller battery in the receiver body to the greater battery in the belt clip; the rechargeable small battery in the receiver body starts being recharged; and the vibrator in the belt clip is made in action.

6 Claims, 2 Drawing Sheets

CALL SELECTIVE RECEIVER BUILT IN WITH VIBRATOR

BACKGROUND OF THE INVENTION

1. Field of the Invention

The present invention relates to a call selective receiver.

More specifically, the invention relates to a call selective receiver which pages a user by applying a mechanical vibration to the body of the user when a call number signal or the like is received.

2. Related Art

A call selective receiver, which pages a user by applying a mechanical vibration generated by a built-in vibrator to the body of the user when a call number signal or the like is received, is usually used by placing the receiver in a breast pocket or in a belt clip fixed to a belt.

Recently, a call selective receiver is also required to be small and thin, and according to this requirement, the electric circuit member, the vibrator and so on are being made smaller and thinner.

Heretofore, as an electric power source, there has been generally used a dry battery which is inexpensive and easy to buy. However, as the electric circuit member, the vibrator and so on of the call selective receiver are being made smaller and thinner, the size of the call selective receiver is restricted by the size of the dry battery. As a result, a small battery or a rechargeable small battery, which have been significantly developed in recent years, is preferably used as an electric power source for a call selective receiver.

However, when the vibrator is made smaller and thinner, it becomes difficult to transmit a mechanical vibration to the body of a user when the receiver is put in a belt clip fixed to a belt, although it may be possible when the receiver is put in a breast pocket. As a result, there is a problem that, in order to surely transmit a mechanical vibration to the body of a user, the size of the receiver becomes necessarily large, thereby imposing restrictions in making the call selective receiver smaller and thinner.

Further, if a small size battery or a rechargeable battery requiring no replacement is selected as an electric power source for a call selective receiver, these batteries cannot be purchased as easily as a dry battery and have a considerably shorter life in comparison with a dry battery. Consequently, there are problems, when using an above-mentioned small size battery, that a spare battery is required to be carried together with the receiver, thereby making the handling of the receiver inconvenient, and when using a rechargeable battery, that a battery charger is required to be carried together with the receiver, thereby making the handling of the receiver inconvenient, and the used up battery can not usually be recharged at an arbitrary time and place.

SUMMARY OF THE INVENTION

An object of the present invention is to solve the above-mentioned problems and to provide a call selective receiver which has a small size and a small thickness and has a vibrator capable of transmitting its vibration to the body of a user even when the receiver is put in a belt clip fixed to a belt, and in which a rechargeable battery accommodated in the receiver can be easily recharged at any time and at any place.

For achieving the above-mentioned object of the present invention, a call selective receiver according to the present invention is composed of a receiver body including a built-in small battery and a built-in vibrator and a belt clip including a built-in dry battery, whereby the power source for the receiver is changed from the small battery in the receiver body to the dry battery in the belt clip when the receiver body is put into the belt clip.

A rechargeable battery is used as the small battery in the receiver body, and this rechargeable battery is adapted to be charged by the dry battery in the belt clip when the receiver body is put into the belt clip.

Further, the belt clip includes a built-in vibrator.

According to the present invention, since the vibrator and an electric power source accommodated in the receiver body can be small and thin, and the size of the receiver is not restricted by the vibrator or the power source, the receiver body can be easily made small and thin.

Further, when the receiver body is put into the belt clip, the dry battery in the belt clip serves as a power source for the receiver. As a result, the receiver has a long life, and when a vibrator capable of producing a great vibration is accommodated in the belt clip, the mechanical vibration can be surely transmitted to the body of a user.

In addition, when the receiver body is put into the belt clip, an electric charging from the dry battery to the rechargeable small battery is automatically started. As a result, the rechargeable battery can be easily charged at any time and at any place.

DESCRIPTION OF THE INVENTION

Figure 1:
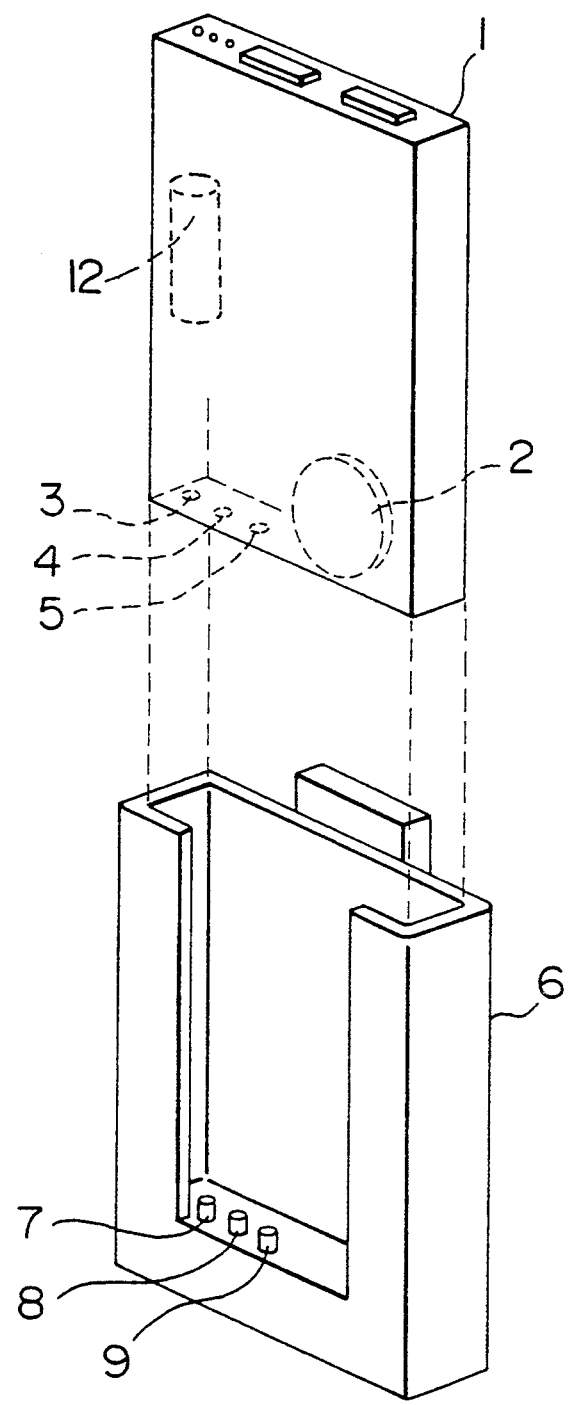
FIG. 1 is a perspective view showing a structure of a call selective receiver according to an embodiment of the present invention.
Figure 2:
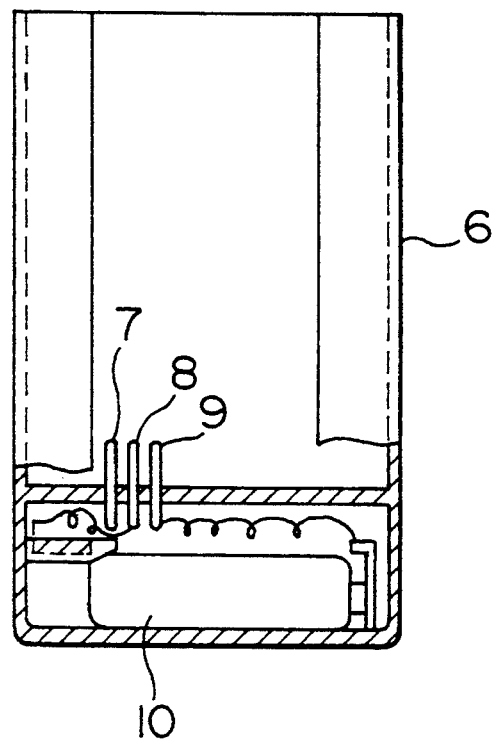
FIG. 2 is a front view of a belt clip according to an embodiment of the present invention with the lower portion illustrated in section.
Figure 3:
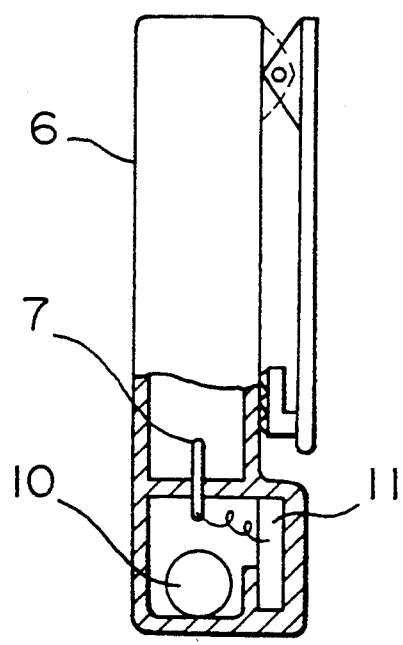
FIG. 3 is a right side view of a belt clip according to an embodiment of the present invention with the lower portion illustrated in section.

Referring to FIGS. 1 to 3 showing a structure of a call selective receiver according to an embodiment of the present invention, numeral 1 denotes a receiver body which is built in with a rechargeable small battery 2 such as a rechargeable coin battery, a receiving electronic circuit (not shown) and a vibrator, numeral 3 denotes an output terminal for a vibrator control signal disposed at the bottom of the receiver body 1, numerals 4 and 5 denote input terminals for electric charging arranged beside the output terminal 3 for a vibrator control signal, numeral 6 denotes a belt clip for putting therein the receiver body 1, numeral 7 denotes an input terminal for a vibrator control signal, which is connected with the output terminal 3 for a vibrator control signal when the receiver body 1 is put into the belt clip 6, and numerals 8 and 9 denote output terminals for electric charging arranged beside the input terminal 7 for a vibrator control signal, which are connected with the input terminals 4 and 5 for electric charging when the receiver body 1 is put into the belt clip 6. Numeral 10 denotes a dry battery such as a built-in battery of LR6 type (refer to FIG. 2) disposed at the bottom of the belt clip, and numeral 11 denotes a built-in vibrator disposed also at the bottom of the belt clip, which is larger in size than the vibrator 12 in the receiver body 1.

In this embodiment having the above-mentioned arrangement, when a user intends to use a receiver body 1 by putting it in a breast pocket, the rechargeable small battery in the receiver body functions as an electric power source for the receiver body 1, and when a call number sign is received, the vibrator 12 in the receiver body 1 vibrates, thereby calling up the user.

On the other hand, when a user intends to use a receiver body 1 by fixing it at the user's belt, the receiver is put into a belt clip fixed to the belt of the user, whereby the output terminal 3 for a vibrator control signal is connected with the input terminal 7 for a vibrator control signal, and at the same time, the input terminals 4 and 5 for electric charging are connected with the output terminals 8 and 9 for electric charging. As a result, a dry battery 10 in the belt clip 6 functions as an electric power source for the receiver body 1, and when a call signal is received, the vibrator 12 in the receiving body 1 starts vibrating, thereby calling up the user.

When the strength of vibration of the vibrator 12 in the receiver body 1 is not sufficient to transmit the vibration to the body of a user, the receiver is switched into a vibrator mode and put into the belt clip 6. In this case, when a call number signal is received, a vibrator control signal generated in the receiver body 1 is transmitted through the output terminal 3 and the input terminal 7 for a vibrator control signal to the vibrator 11 in the belt clip 6, thereby vibrating this vibrator 11 and calling up the user.

Further, when the rechargeable small battery 2 in the receiver body 1 has run down and is required to be charged, the receiver body 1 is put into the belt clip 6 with the charging input terminals 4 and 5 connected with charging output terminals 8 and 9. In this situation, the rechargeable small battery 2 is recharged by an electric current flowing from the dry battery 10, only excluding when the vibrator 12 in the receiver body 1 or the vibrator 11 in the belt clip 6 is in action. After the rechargeable small battery 2 has been charged, the receiver body 1 can be used as in the belt clip or as separated from the belt clip, as desired.

As mentioned above, according to the present invention, the receiver body 1 is built-in with a small vibrator 12 and a rechargeable small battery 2, and the belt clip 6 is built in with a dry battery 10 whose life is significantly longer than that of the rechargeable small battery 2 in the receiver body 1 and with a relatively large vibrator 11. When the receiver body 1 is put into the belt clip 6, the electric power source for the receiver body is switched to the dry battery 10 in the belt clip 6, and at the same time, the rechargeable small battery 2 starts to be electrically charged and the vibrator 12 in the belt clip 6 also becomes available for use.

In consequence, there is a first advantage that the vibrator 12 and the electric power source in the receiver body 1 can be made small and thin, thereby providing a receiver body having a small and thin size.

A second advantage is that the life of the receiver body 1 can be made longer, because a dry battery 10 serves as a power source when the receiver body 1 is kept in the belt clip 6, and that the mechanical vibration can be surely transmitted to the body of a user, if a vibrator capable of generating a strong vibration is used in the belt clip 6.

A third advantage is that the rechargeable small battery 2 in the receiver body 1 can be simply charged at any time and at any place, because an electric charging from the dry battery 10 in the belt clip 6 to the rechargeable small battery 2 in the receiver body 1 is automatically started when the receiver body 1 is put into the belt clip 6.

What is claimed is:

1. A call selective receiver, comprising:
   a receiver body;
   a first power source housed in the receiver body and having a first electric capacity;
   a first vibrator also housed in the receiver body and having a first vibration amplitude;
   a belt clip having a cavity therein configured to receive the receiver body;
   a second power source housed in the belt clip and having a second electric capacity greater than the first electric capacity;
   a second vibrator also housed in the belt clip and having a second vibration amplitude greater than the first vibration amplitude, whereby a vibration can be transmitted to a user through the belt clip; and
   a power source switching means for switching from the first power source in the receiver body to the second power source in the belt clip when the receiver body is inserted into the belt clip.

2. A call selective receiver as claimed in claim 1, wherein the power source switching means comprises a pair of input terminals and a pair of output terminals, the pairs being connected with or disconnected from each other when the receiver body is inserted into or removed from the belt clip, respectively.

3. A call selective receiver as claimed in claim 1, wherein the first power source in the receiver body is rechargeable, and can be recharged from the second power source when the receiver body is inserted into the belt clip.

4. A call selective receiver as claimed in claim 1, wherein the second power source is a dry battery.

5. A call selective receiver as claimed in claim 1, further comprising a control signal transmitting means disposed between the receiver body and the belt clip, for transmitting a control signal for switching from the first vibrator in the receiver body to the second vibrator in the belt clip when the receiver body is inserted into the belt clip.

6. A method of driving a vibrator of a call selective receiver, comprising:
   providing a receiver body housing a first power source and a first vibrator;
   providing a belt clip housing a second power source and a second vibrator, and having a cavity configured for receiving the receiving body; and
   transmitting a call signal to a user's body through the belt clip when the receiver body is inserted into the belt clip by driving the second vibrator when a call signal is received.

* * * * *